US008447265B2

(12) United States Patent
Flippo et al.

(10) Patent No.: US 8,447,265 B2
(45) Date of Patent: May 21, 2013

(54) PROXIMITY BASED EMERGENCY COMMUNICATION SYSTEM

(75) Inventors: Robert Flippo, Boca Raton, FL (US); Elias Janetis, Boca Raton, FL (US)

(73) Assignee: Integrity Tracking, LLC, Boca Raton, FL (US)

( * ) Notice: Subject to any disclaimer, the term of this patent is extended or adjusted under 35 U.S.C. 154(b) by 0 days.

(21) Appl. No.: 12/819,865

(22) Filed: Jun. 21, 2010

(65) Prior Publication Data

US 2010/0311388 A1  Dec. 9, 2010

Related U.S. Application Data

(63) Continuation-in-part of application No. 12/322,566, filed on Feb. 3, 2009, now Pat. No. 8,086,250.

(51) Int. Cl.
*H04M 11/04* (2006.01)
*H04M 3/00* (2006.01)
*H04W 24/00* (2009.01)
*H04B 1/38* (2006.01)

(52) U.S. Cl.
USPC ............... 455/404.2; 455/420; 455/456.1; 455/574

(58) Field of Classification Search
USPC ............. 455/343.1–343.5, 404.1–404.2, 415, 455/427–430, 456.1–456.3, 456.5–456.6, 455/466, 550.1, 556.1–556.2, 560–561, 574, 455/3.05, 41.2, 41.3, 67.11, 343.3, 417–418, 455/420–421, 426.1–426.2, 434, 435.2, 500, 455/507, 515, 521, 552.1, 554.1–554.2, 555; 342/357.1, 357.22, 357.25, 357.28, 357.29, 342/357.43; 709/203, 218–219, 226, 228–229; 370/395.42–395.43, 395.5, 395.52, 913
See application file for complete search history.

(56) References Cited

U.S. PATENT DOCUMENTS

| 4,598,275 | A |   | 7/1986 | Ross et al. |
| 4,814,751 | A |   | 3/1989 | Hawkins et al. |
| 5,742,233 | A |   | 4/1998 | Hoffman et al. |
| 5,937,355 | A | * | 8/1999 | Joong et al. ................... 455/466 |
| 6,035,217 | A | * | 3/2000 | Kravitz ......................... 455/561 |
| 6,044,257 | A | * | 3/2000 | Boling et al. ............... 455/404.2 |
| 6,239,700 | B1 |  | 5/2001 | Hoffman et al. |
| 6,339,397 | B1 |  | 1/2002 | Baker |
| 6,400,272 | B1 |  | 6/2002 | Holtzman et al. |

(Continued)

OTHER PUBLICATIONS

International Search Report from PCT/US11/041205.

*Primary Examiner* — Meless N Zewdu
(74) *Attorney, Agent, or Firm* — Edwards Wildman Palmer, LLP; Howard M. Gitten (57) ABSTRACT

A system for 2-way data and voice communication with a user A base station in communicates with a response center. A portable device has a cellular transceiver module, a GPS module and an emergency call button, and is in two-way communication with a response center for communicating the location of the portable device to the response center in response to activation of the emergency call button. A wearable pendant has a panic button, and outputs a signal in response to activation of the panic button. The portable device receives the signal and contacts the response center in response to the signal when the portable device is not in proximity to the base station; and the base station receives the signal and the base station communicates with the response center when the portable device is in proximity of the base station.

8 Claims, 10 Drawing Sheets

U.S. PATENT DOCUMENTS

| | | |
|---|---|---|
| 6,544,171 B2 | 4/2003 | Beetz et al. |
| 6,590,525 B2 | 7/2003 | Yule et al. |
| 6,624,754 B1 | 9/2003 | Hoffman et al. |
| 6,636,732 B1 * | 10/2003 | Boling et al. ............. 455/404.1 |
| 6,661,340 B1 | 12/2003 | Saylor et al. |
| 6,678,514 B2 | 1/2004 | Wheeler et al. |
| 6,700,533 B1 | 3/2004 | Werb et al. |
| 6,965,313 B1 | 11/2005 | Saylor et al. |
| 7,016,478 B2 * | 3/2006 | Potorny et al. .................. 379/49 |
| 7,038,590 B2 | 5/2006 | Hoffman et al. |
| 7,138,916 B2 | 11/2006 | Schwartz et al. |
| 7,864,927 B2 * | 1/2011 | Loizeaux ........................ 379/37 |
| 7,907,931 B2 * | 3/2011 | Hartigan et al. ........... 455/404.2 |
| 7,933,581 B2 * | 4/2011 | Wijayanathan et al. ... 455/404.2 |
| 2003/0027547 A1 * | 2/2003 | Wade ............................. 455/404 |
| 2005/0221796 A1 | 10/2005 | Pellegrino et al. |
| 2006/0154642 A1 | 7/2006 | Scannell, Jr. |
| 2006/0182076 A1 | 8/2006 | Wang |
| 2007/0082652 A1 | 4/2007 | Hartigan et al. |
| 2007/0243855 A1 | 10/2007 | Hoffman et al. |
| 2007/0270164 A1 | 11/2007 | Maier et al. |
| 2007/0293186 A1 | 12/2007 | Lehmann |
| 2008/0227429 A1 | 9/2008 | Hodgson et al. |
| 2009/0040041 A1 | 2/2009 | Janetis et al. |
| 2009/0143047 A1 | 6/2009 | Hays et al. |
| 2009/0181638 A1 * | 7/2009 | Gottlieb ..................... 455/404.1 |

* cited by examiner

PROXIMITY BASED EMERGENCY COMMUNICATION SYSTEM

CROSS-REFERENCE TO RELATED APPLICATIONS

This application is a Continuation-in-Part of U.S. patent application Ser. No. 12/322,566 entitled "Communications Method" filed on Feb. 3, 2009 the contents of which are incorporated herein by reference in its entirety.

BACKGROUND OF THE INVENTION

The present invention relates to a communications method. More specifically, the present invention relates to a method of efficiently providing communication with and monitoring the location of an individual utilizing a unique blend of various technologies.

A variety of prior art systems have been proposed for the tracking of patients or other objects. Examples of some of such devices and systems are described below.

Hawkins et al., U.S. Pat. No. 4,814,751 sets off an alarm when the signal strength of a transmitted signal falls below a predetermined level. Narcisse, U.S. Pat. No. 4,593,273 provides a similar out of range alarm system. These patents deal with a simple strap on transmitter. In that regard, these devices are more akin to the traditional house arrest system that transmits periodically to a fixed receiver. In this case, instead of an auto dialer, it sounds an audible alarm. The present invention, by contrast, incorporates both a receiver and transmitter that can communicate with multiple base stations. This allows the unit itself to communicate in both directions and in conjunction with other short range RF devices such as Zigbee can be used to track the unit without use of the GPS or transmitter.

Ross et al., U.S. Pat. No. 4,598,275 discloses a movement monitoring system having a wrist band 22 including a receiver 30, a battery and switch 32 and a transmitter 34. The receiver is continuously activated and the transmitter is normally deactivated unless activated by the receiver in response to a signal from a detector. This patent specifically identifies the problems of bulky batteries and of the need to recharge such a device if it is left in transmit mode all of the time.

Beetz et al., U.S. Pat. No. 6,544,171 discloses a system for patient monitoring which includes a body sensor for measuring a physiological parameter. This device utilizes a cellular mobile radiotelephone system for tracking purposes. The unit in this patent uses a dedicated sensor device.

Baker, U.S. Pat. No. 6,339,397 discloses a self-contained tracking unit and GPS tracking system. This device utilizes solar power to address power consumption issues.

Werb et al., U.S. Pat. No. 6,700,533 discloses an asset and personnel tagging system utilizing GPS. Werb et al. primarily use a local area LAN, like WiFi, or RFID, to relay GPS data to a server. To use the Werb et al. device, a mobile unit needs to be deployed in the area the tag is to be used and Werb et al. illustrate a truck being used on a construction yard with RFID relaying GPS data to it.

Schwartz et al., U.S. Pat. No. 7,138,916 discloses a computerized system which provides a method to inventory articles, to locate lost or stolen articles and to recover a lost or stolen article. The system applies an electronic tag to each article of a multiplicity of articles or only to a valuable article and employs a computer to maintain an inventory of all articles. Use is made of a global positioning system to locate a lost or stolen article as well as to track movements of the article. A history of the movement of the article may also be plotted on a map. An electronic geographic boundary area may also be placed around an article that can be used to emit a signal indicative of the article leaving the area. This patent is used for asset tracking and its programming was unique, setting it apart from other devices of this type.

Holtzman et al., U.S. Pat. No. 6,400,272 discloses a method of communicating with a RFID tag in which a signal is received from a RFID tag, the tag is identified and a request is sent to the tag for additional data based upon the identified tag type.

Maier et al., United States Patent Application Pub. No. US 2007/0270164A1 dated Nov. 22, 2007 discloses a system and method for an emergency location information service which provides current geographic location for a mobile and non-mobile device (buildings etc.). The method may be used with a communications network 18 of a variety of specified types and allows signals from a first mobile network device to be sent to plural other network devices which includes geographical location information regarding the first device to initiate an emergency communication.

Wang, United States Patent Application Pub. No. US 2006/0182076A1, dated Aug. 17, 2006, discloses a method and system for mesh network embedded devices and relates to a method of managing such networks. The mesh network device wirelessly exchanges information with other mesh network devices on a wireless mesh network or wireless partial mesh network and uses wireless base band connector of various specified types (such as Bluetooth, IEEE, 802.11 (a)(b) or (g), 802.11.15 and 802.11.5.4-ZigBee).

Scannell, J R., United States Patent Application Pub. No. US 2006/0154642A1, dated Jul. 13, 2006, discloses a medication and health, environmental, and security monitoring, alert, intervention, information and networking system with associated and supporting apparatus. The system can be used with a variety of wireless protocols (such as WiFi and Zig-Bee) and utilizes a wireless communication interface in combination with a processor for activities such as tracking patient progress, creating reminder alerts and monitoring medication dosage.

Various devices and methods have been proposed but all of such known devices and methods still provide less than ideal results. Thus, there remains a need for an improved communications method which solves a number of problems with the prior art.

BRIEF SUMMARY OF THE INVENTION

The present invention, in its simplest form, provides a system for 2-way data and voice communication with a user. A base station communicates with a response center. A portable device has a cellular transceiver module, a GPS module and an emergency call button, and is in two-way communication with a response center for communicating the location of the portable device to the response center in response to activation of the emergency call button when the portable device is not in proximity to the base station. A wearable pendant has a panic button, and outputs an RF signal in response to activation of the panic button. The portable device receives the signal and contacts the response center in response to the RF signal when the portable device is not in proximity to the base station; and the base station receives the RF signal and the base station communicates with the response center when the portable device is in proximity of the base station.

DETAILED DESCRIPTION OF THE PREFERRED EMBODIMENTS

Figure 1:
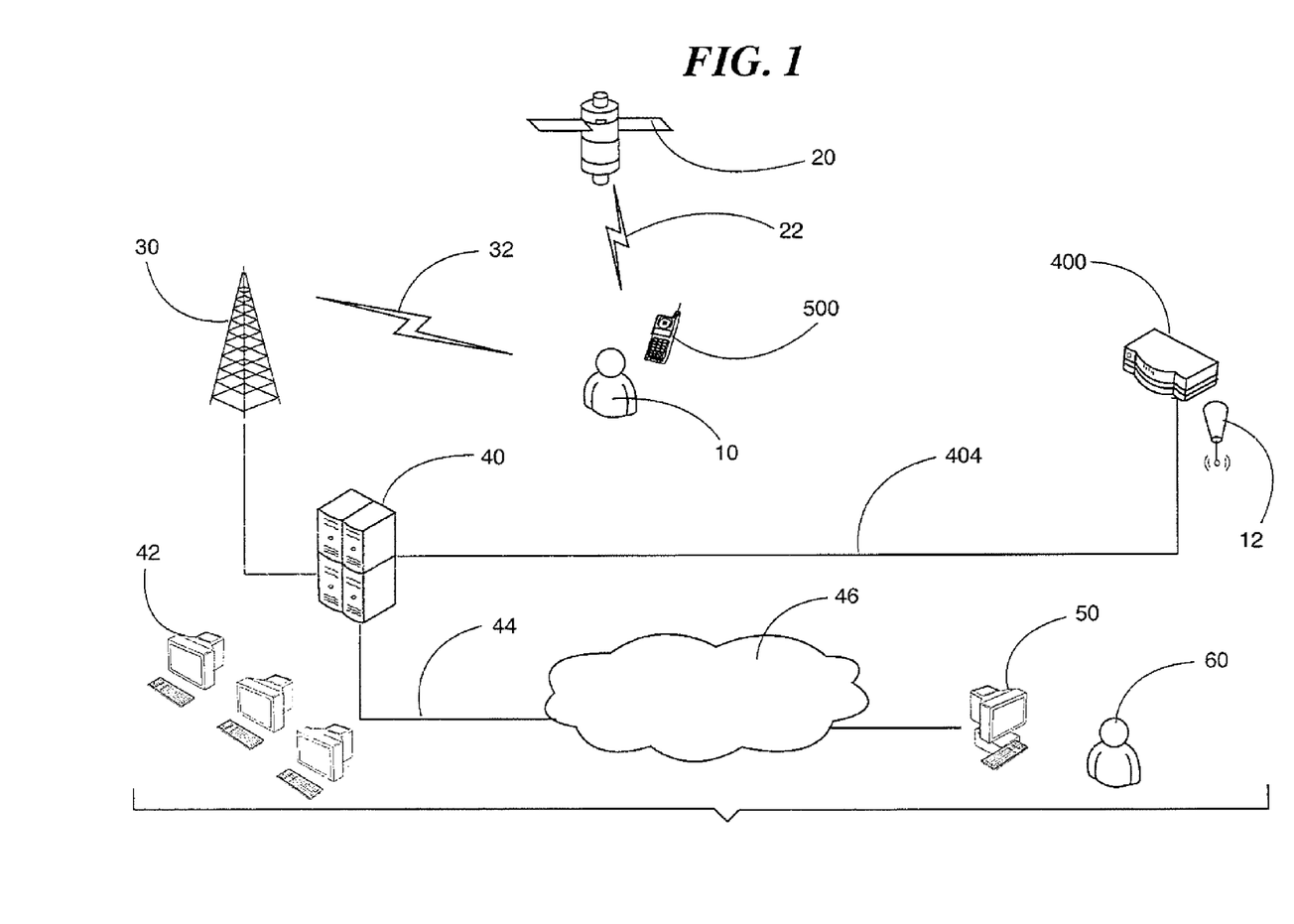
FIG. 1 is a diagrammatic view of the base station and other components of the communications method of the present invention.

Referring to FIG. 1, the basic components utilized with the methods of the present invention are illustrated. These major components include a base station 400, a portable device 500, GPS satellite 20, a cellular tower 30, response center/call center 40, 42, the Internet 46, a remote caregiver 60, and the remote caregiver's computer 50. In FIG. 1, the base station 400 is aware that the user is outside the home when the cellular device 500 is no longer in communication with the base station. A signal can be sent to the response center 40, 42 to log that the user 10 is no longer at home, The GPS satellite 20 receives a GPS signal 22 from the portable device 500 when the portable device 500 is outside the range of the home base station 400. The portable device 500 logs data and periodically sends data to the response center 40, 42 via a cellular data connection. A GSM GPRS communication link 32 with voice and data provides communication with the cell tower 30. When activated, the portable device 500 will dial a predetermined number and be connected to the response center 40, 42 through line 34. A GPS location will be sent via the data link while the call is taking place. In addition, the portable device 500 will periodically send location data via the cellular data link at predetermined intervals. As can be seen, the response center 40 is connected to the base station 400 by means of a PSTN connection 404. The response center 40 is connected to the Internet 46 by line 44 which also provides a link to a computer 50 located at the location of a remote caregiver 60. The response center 40 is manned by terminals or PCs 42 at the center. In FIG. 1, the RFID pendant 12 is shown to be in proximity to the base station 400. Further, in FIG. 1, the remote caregiver 60 can log into the system with PC 50 to determine the location of the user 10. A mapping feature allows the user 10 to be located and to track their movements.

Figure 2:
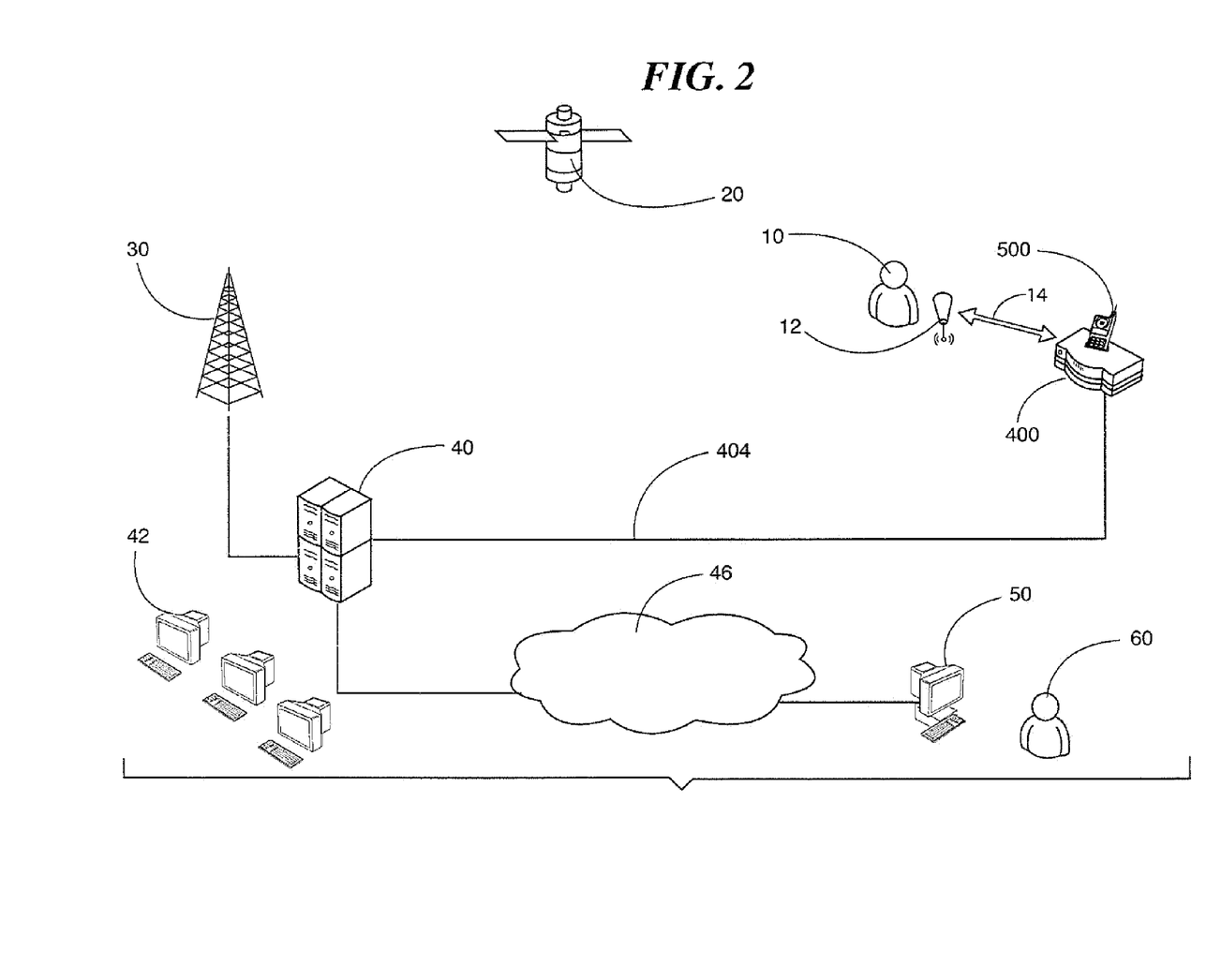
FIG. 2 is a diagrammatic view of the components of the present invention with a user pendant and portable device within proximity to the base station.

FIG. 2 shows the same basic components as FIG. 1 but in FIG. 2 a simple RF connection 14 is established between the base station 400 and the RF pendant 12. In this case, the user 10 switches to the RF pendant 12 and places the cellular device 500 (portable device) in the charging cradle on the base station 400. In this mode of operation GPS data is not required and the GPS module is placed in a standby mode. Further, in this mode, the GSM GPRS communications link in not required and this module is also placed in a standby mode. The base station 400 is aware that the user 10 is inside the home when the portable cellular device 500 is in communication with the base station 400 and/or the portable cellular device 500 is charging in the cradle. A signal can be sent to the response center 40 to log that the user 10 is at home. If the user 10 depresses the panic button on the RF pendant 12 when the pendant is out of range of the base station 400, the RF pendant 12 will transmit a simple RF signal to the base station 400. In this mode the remote caregiver 60 can log into the system to determine if the user 10 is at home or out of range of the base station 400. In this standard mode, location data will not be provided on a routine basis.

Referring to FIG. 3 again the same basic components are shown. In this mode the base station 400 is aware that the user 10 is outside the home when the cellular device 500 is no longer in communication with the base station 400. This signaling is accomplished via standard RE protocol from the base station 400 to the portable device 500. The base station 400 is sending a ping on regular intervals to determine if the portable device 500 is in range. A signal can be sent to the response center 40 to log that the user 10 is no longer at home. The GPS signal 22 is received by the portable device 500 when the portable device 500 is outside the range of the home base station 400 from the GPS satellite 20. A GSM GPRS communication link with both voice and data 32 is provided and when activated the portable device 500 will dial a predetermined number and will be connected to the response center 40. Upon connection to the response center 40, the portable device 500 will send a DTMF signal in a 4×2 format to indicate the user 10 ID. The GPS location will be sent via the data link while the call is taking place.

Figure 3:
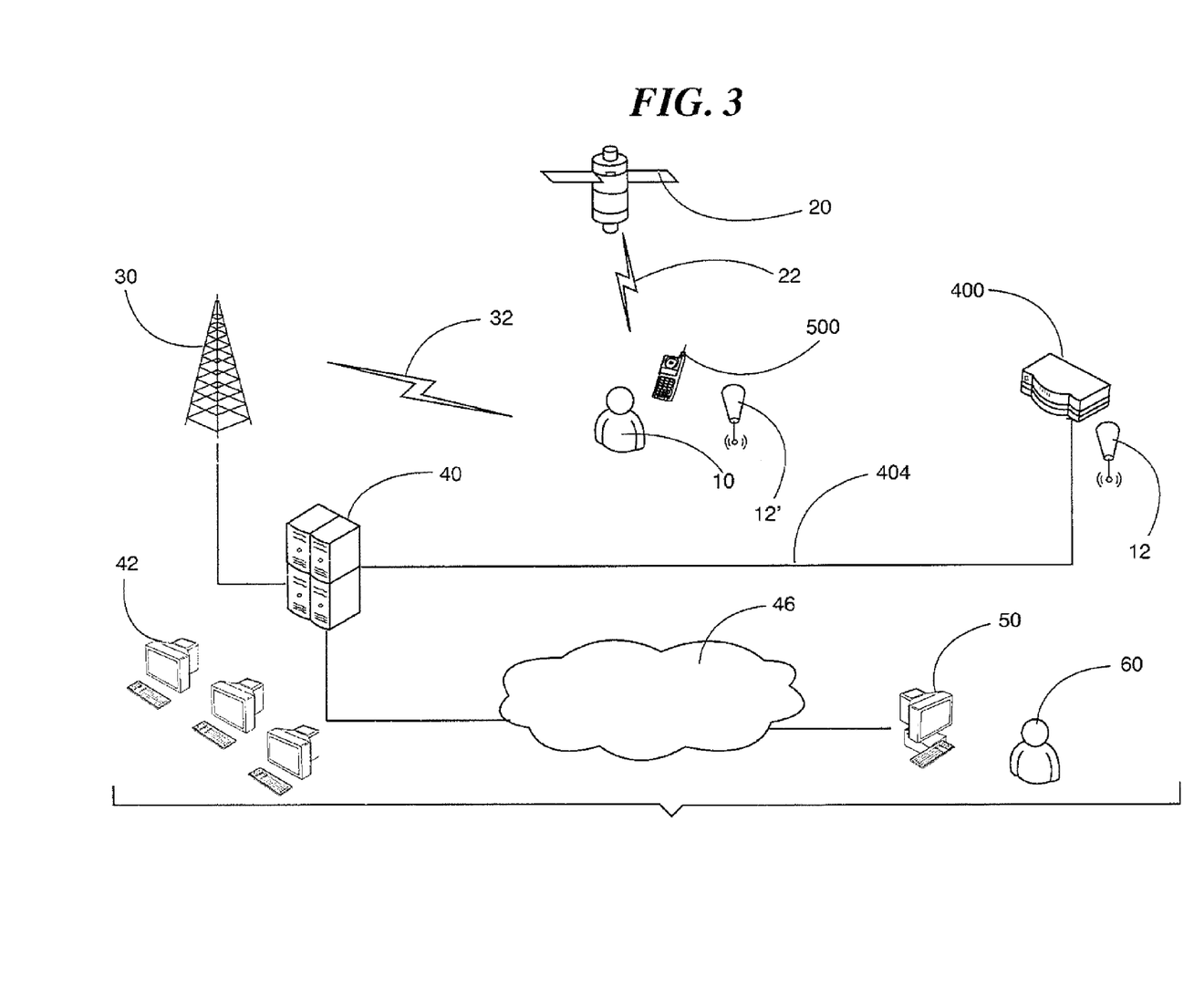
FIG. 3 is a diagrammatic view of the components of the present invention with the portable device not in proximity to the base station.

In a preferred embodiment, RE Pendant 12 is in 1-way communication with both base station 400 and mobile device 500. Mobile device 500 is in 2-way communication with base station 400 and is also capable of directly communicating with response center 40. In other words, both mobile device 500 (as discussed below) and base station 400 (as discussed above) are adapted to perform a function in response to a signal from pendant 12.

During operation depression of the panic button on RF Pendant 12 causes a 1-way panic signal to be produced. When RE Pendant is in proximity of base station 400, mobile device 500 is in communication with base station 400 as discussed above, and base station 400, not mobile device 500, will initiate a call as discussed above. Base station 400 signals device 500 that they are in proximity so that mobile device 500 does not make a simultaneous call wasting assets and confusing any remote caregiver. However, if RF Pendant 12 is not in proximity to base station 400, i.e., sufficiently distant such that the RF signal is not received by base station 400, but in communication with mobile device 500, then the panic signal causes mobile device 500 to execute the call to response center 40 and a caregiver 60 as discussed above. In this way, a simple pendant which may be hung around the neck or wrist may be used. The pendant is always accessible, as opposed to always carrying the larger mobile device 500. The mobile device 500 may now be carried in a pocket, purse or a pocketbook, gym bag, back pack or the like. This frees up the use of both hands.

Figure 4:
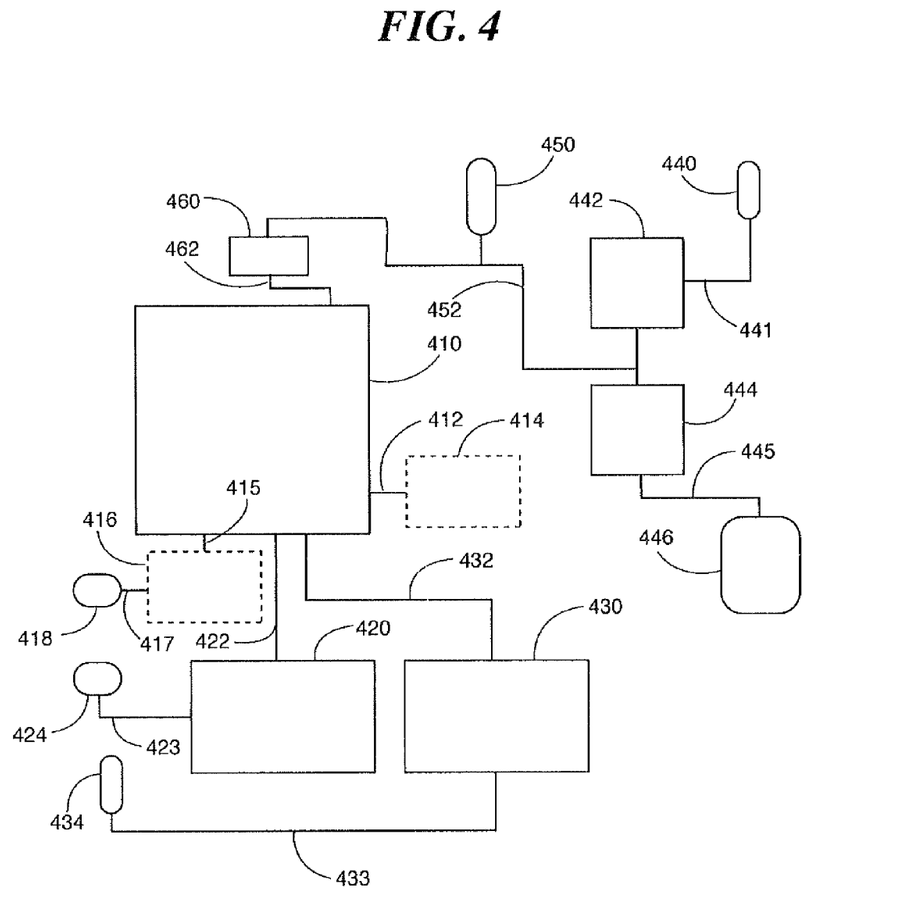
FIG. 4 is a schematic diagram of the base station utilized with the method of the present invention.

Referring to FIG. 4 the base station includes a CPU Module 410 is provided which is connected by line 462 to a RS232/USB Converter 460. This converter 460 is connected via line 452 to a USB/B Connector 450 and to external power. A power regulator 442 is connected by line 441 to an outlet 440. A battery charging circuit 444 is provided and is connected by line 445 to battery 446. Optionally, a 1-10 MB Serial Storage device 414 can be connected to the CPU Module 410 via line 412. Further, an optional Ethernet connection 416 having a RJ-45 port 418 connected by line 417 may be provided. CPU Module 410 is connected by line 422 to a Modem 420. The Modem 420 is connected by line 423 to an RJ-11 port 424. The CPU Module 410 is connected by line 432 to a RFID Mesh Network Receiver 430 which is in turn connected by line 433 to an RFID Antenna 434.

It should be understood, that base station 400 may also be a wireless communication device making use of cellular telephone or radio frequency technologies. In this way, base station 400 is also somewhat portable capable of travel to hotels, vacation and second homes and the like. In this way, base station 400 need not be reinitialized, set up, or wired each time a user changes their domicile. Additionally, it is well within the scope of the invention that base station 400 is incorporated into the security system of the home and may be part of the installed alarm box. Additionally, in a preferred embodiment, base station 400, pendant 12 and mobile device 500 communicate using RF signals, however, any mode of communication between electronic devices enabling the functionality described above is within the scope of the invention.

Figure 5:
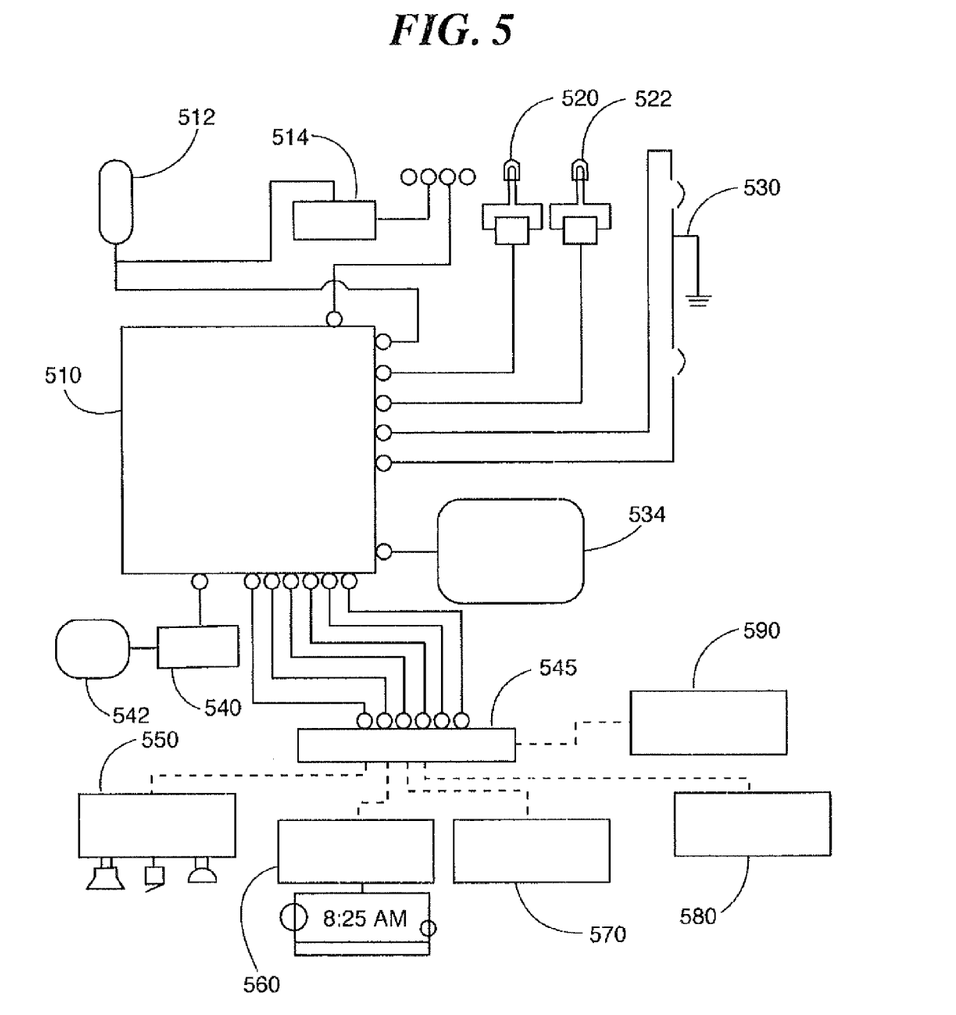
FIG. 5 is a schematic view of the portable device utilized with the method of the present invention.

Referring to FIG. 5, the portable device 500 includes a cellular phone mobile 510. A USB connector 512 is connected to a RS232/USB Converter 514. The Module 510 is connected to a power source 530 and is also connected to battery 534. A first LED 520 and a second LED 522 are provided. Module 510 is also connected to a GPS Preamp 540 which has a GPS Antenna 542. A plug-in socket 545 may be utilized to connect various components including an Audio Board 550, a Display Board 560, an RFID Board 570, a Bluetooth Module 580 and a simple RF board 590.

Figure 6:
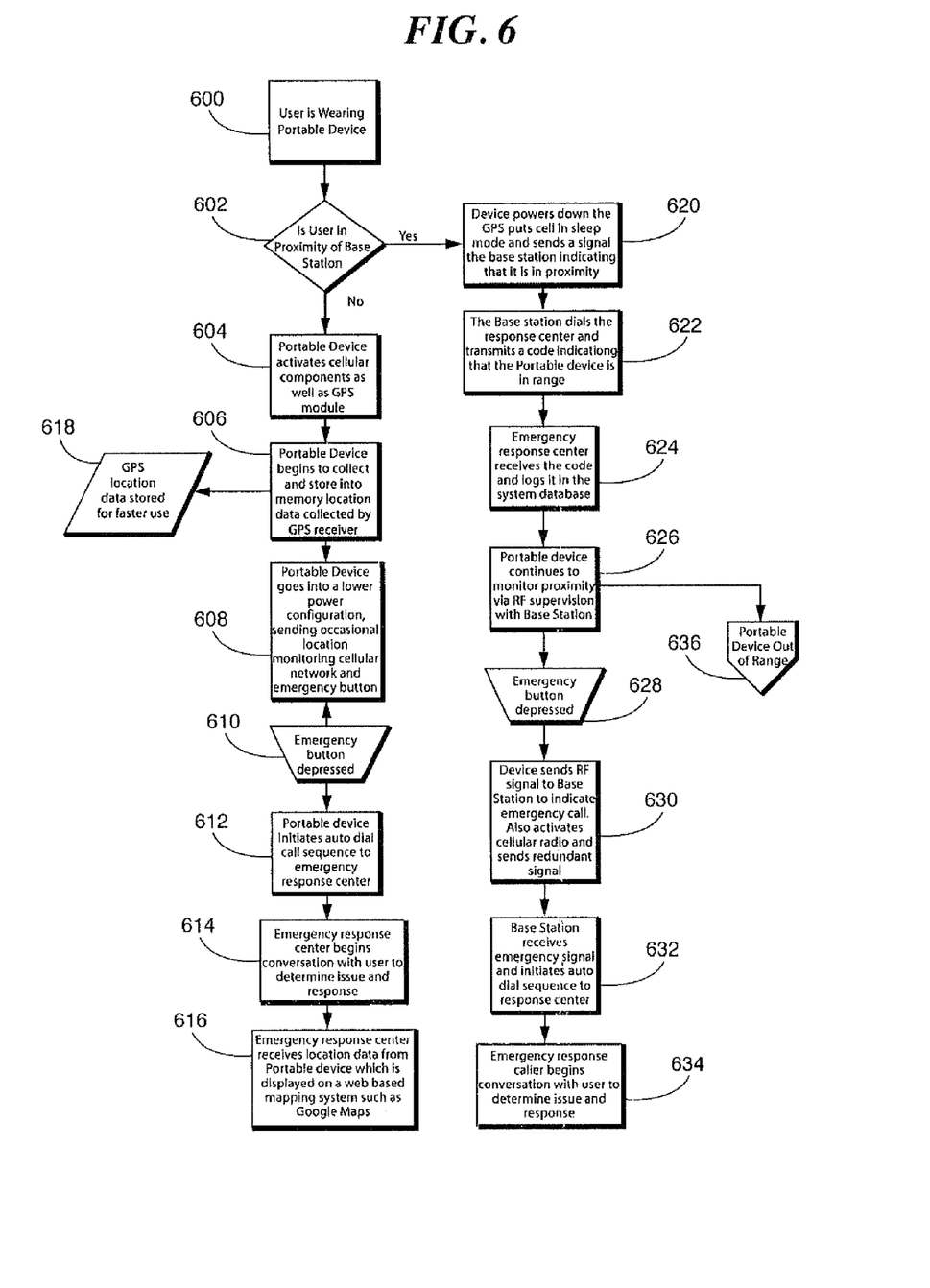
FIG. 6 is a flow chart showing the process steps of a presently preferred embodiment of the present invention.

Referring to the flow chart of FIG. 6 the following steps in the method are shown:
- 600—User is wearing portable device 500.
- 602—Is user in proximity to base station 400.
- 604—Portable Device 500 activates cellular components as well as GPS module.
- 606—Portable Device 500 begins to collect and store into memory location data collected by GPS receiver.
- 608—Portable Device 500 goes into a lower power configuration, sending occasional location, monitoring cellular network and emergency button.
- 610—Emergency button on portable device 500 is depressed.
- 612—Portable Device 500 initiates auto dial call sequence to emergency response center.
- 614—Emergency response 40, 42 center begins conversation with user to determine issue and response
- 616—Emergency response center 40, 42 receives location data from portable device which is displayed on a web based mapping system such as Google Maps.
- 618—GPS location data stored for later use.
- 620—Portable Device powers down the GPS, puts cell in sleep mode, and sends a signal to the base station indicating that it is in proximity,
- 622—The Base Station 400 dials response center and transmits a code indicating that the Portable device 500 is in range.
- 624—Emergency response center, 40, 42 receives the code and logs it in the system database.
- 626—Portable device 500 continues to monitor proximity of base station 400 via RF communication.
- 628—Emergency button on portable device 500 depressed.
- 630—Portable Device 500 sends RF signal to Base Station to initiate emergency call. Also activates cellular radio and sends redundant signal.
- 632—Base Station 400 receives emergency signal and initiates auto dial sequence to response center.
- 634—Emergency response center 40, 42 begins conversation with user to determine issue and response.
- 636—Portable Device 500 Out of Range.

Figure 7:
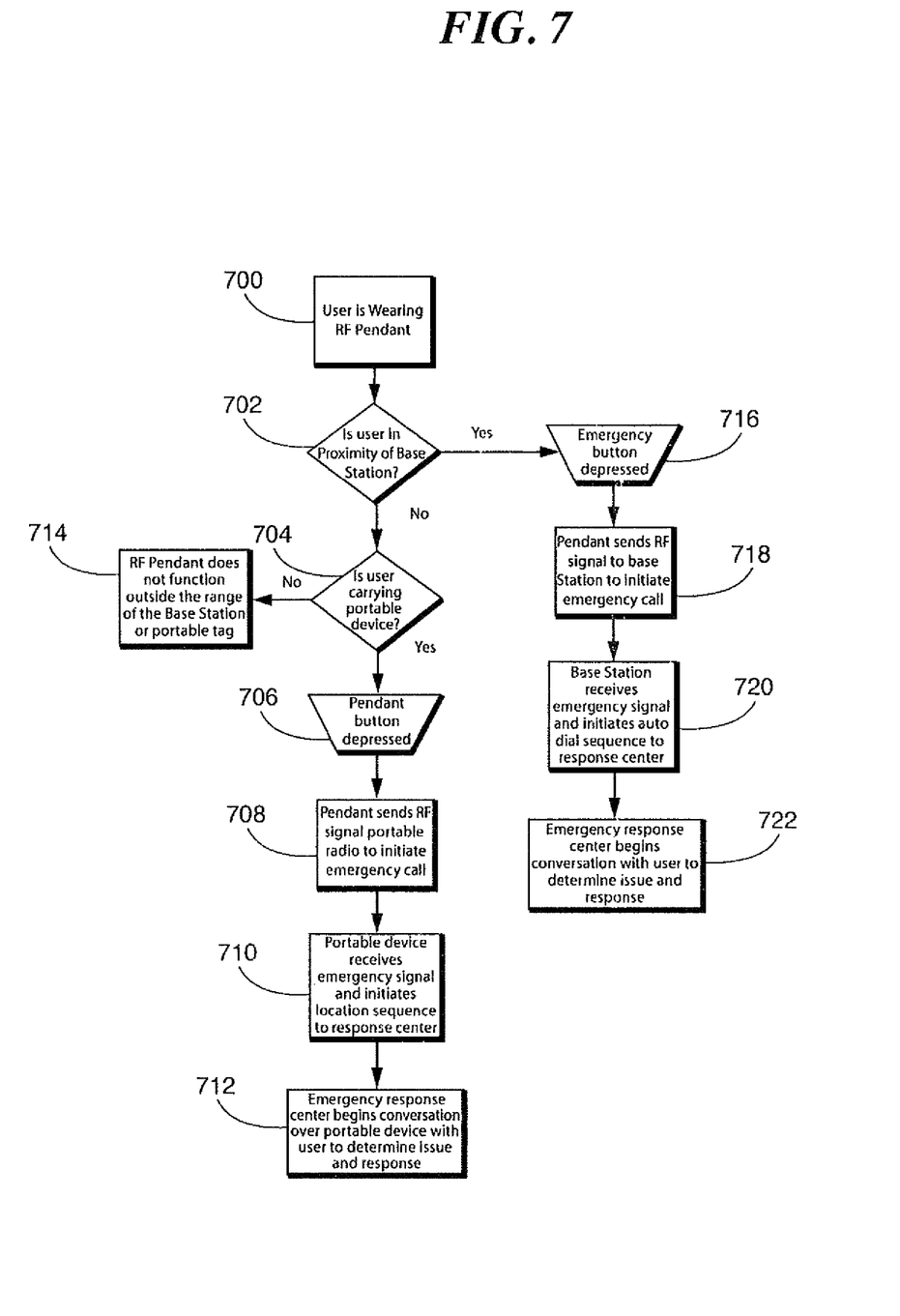
FIG. 7 is a flow chart showing the process steps of alternative embodiments of the method of the present invention.

Referring to the flow chart of FIG. 7 the following steps in the method are shown:
- 700—User is Wearing RF Pendant 12
- 702—Is User in Proximity of Base Station 400
- 704—Is User wearing portable device 500
- 706—Emergency button on RF Pendant 12 depressed.
- 708—RF Pendant 12 sends RF signal to portable device 500 to initiate emergency call.
- 710—Portable Device 500 receives emergency signal and initiates location sequence to response center 40, 42.
- 712 Emergency response center 40, 42 begins conversation with user to determine issue and response.
- 714—RF Pendant 12 is not able to communicate (and therefore does not function) outside the range of the Base Station 400 and mobile device 500.
- 716 Emergency button on pendant 12 is depressed.
- 718—Portable Device 500 sends RF signal to Base Station to initiate emergency call.
- 720—Base Station 400 receives emergency signal and initiates auto dial sequence to response center.
- 722—Emergency response center 40, 42 begins conversation with user to determine issue and response.

Figure 8:
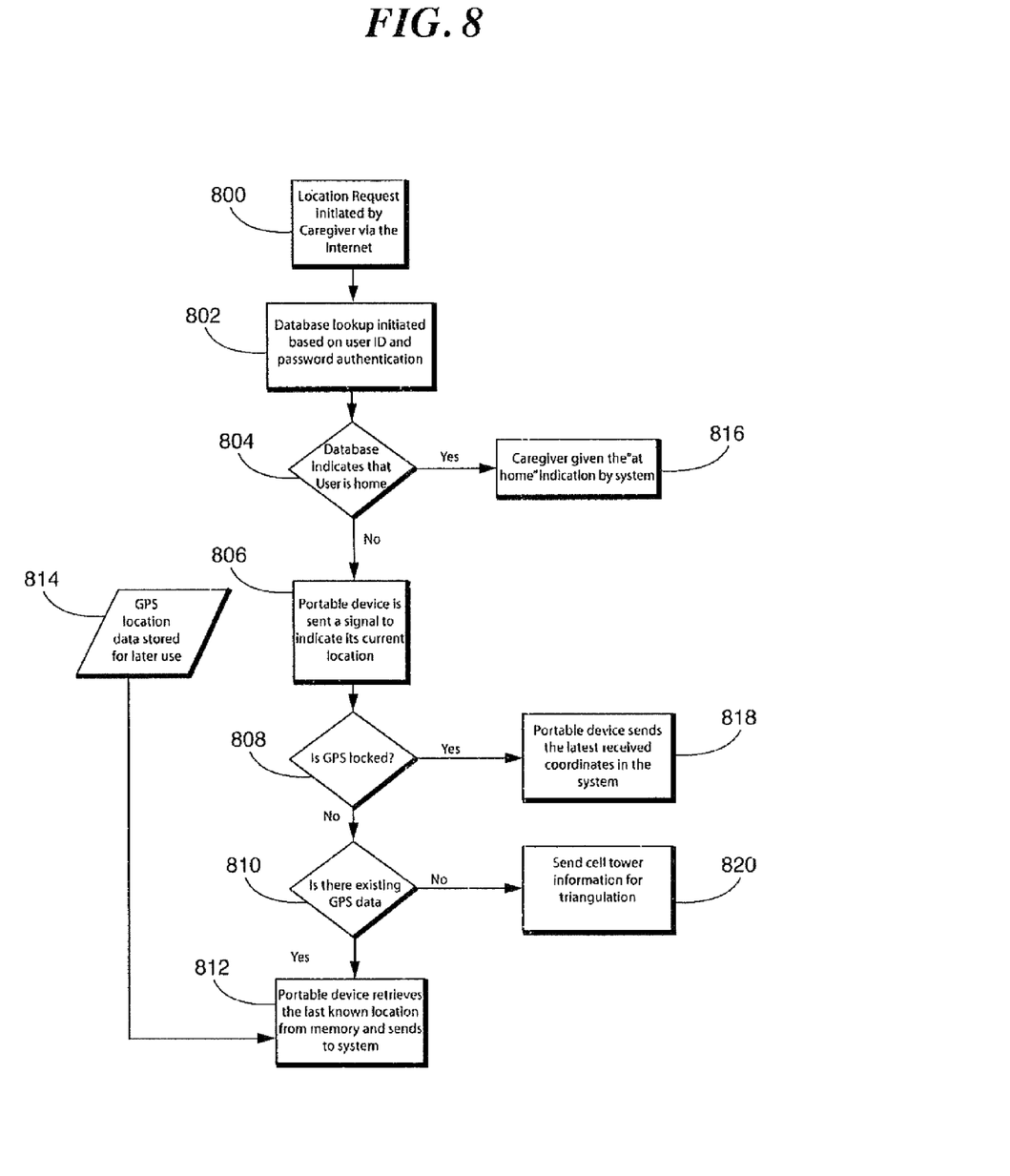
FIG. 8 is a flow chart showing the process steps of still further embodiments of the method of the present invention.

Referring to the flow chart of FIG. 8 the following steps in the method are shown:
- 800—Location Request Initiated by Caregiver 60 via the Internet 46.
- 802—Database lookup initiated based on user ID and password authentication.
- 804—Database indicates that User 10 is home.
- 806—Portable device 500 is sent a signal to indicate its current location.
- 808—Is GPS locked?
- 810—Is there existing GPS data?
- 812—Portable Device 500 receives last known location from memory and sends to system.
- 814—GPS location data stored for later use.
- 816—Caregiver 60 given the "at home" indication by system 40, 42.
- 818—Portable device sends the latest received coordinates to the system.
- 820—Send cell tower 30 information for triangulation.

Figure 9:
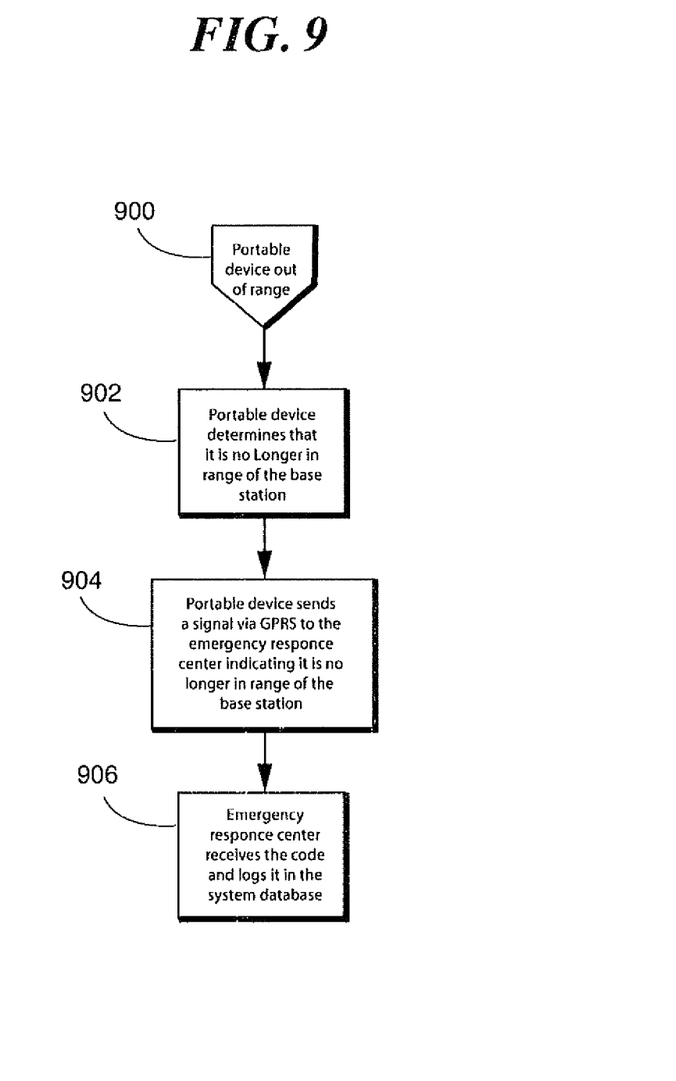
FIG. 9 is a flow chart showing the process steps of a still further embodiment of the method of the present invention.

Referring to the flow chart of FIG. 9 the following steps in the method are shown:
- 900—Portable Device 500 Out of Range.
- 902—Portable Device 500 determines that it is no longer in range of the Base Station 400.
- 904—Portable device 500 sends a signal via GPRS to the emergency response center 40, 42 indicating it is no longer in range of the Base Station 400.
- 906—Emergency response center 40, 42 receives the code and logs it in the system database.

Figure 10:
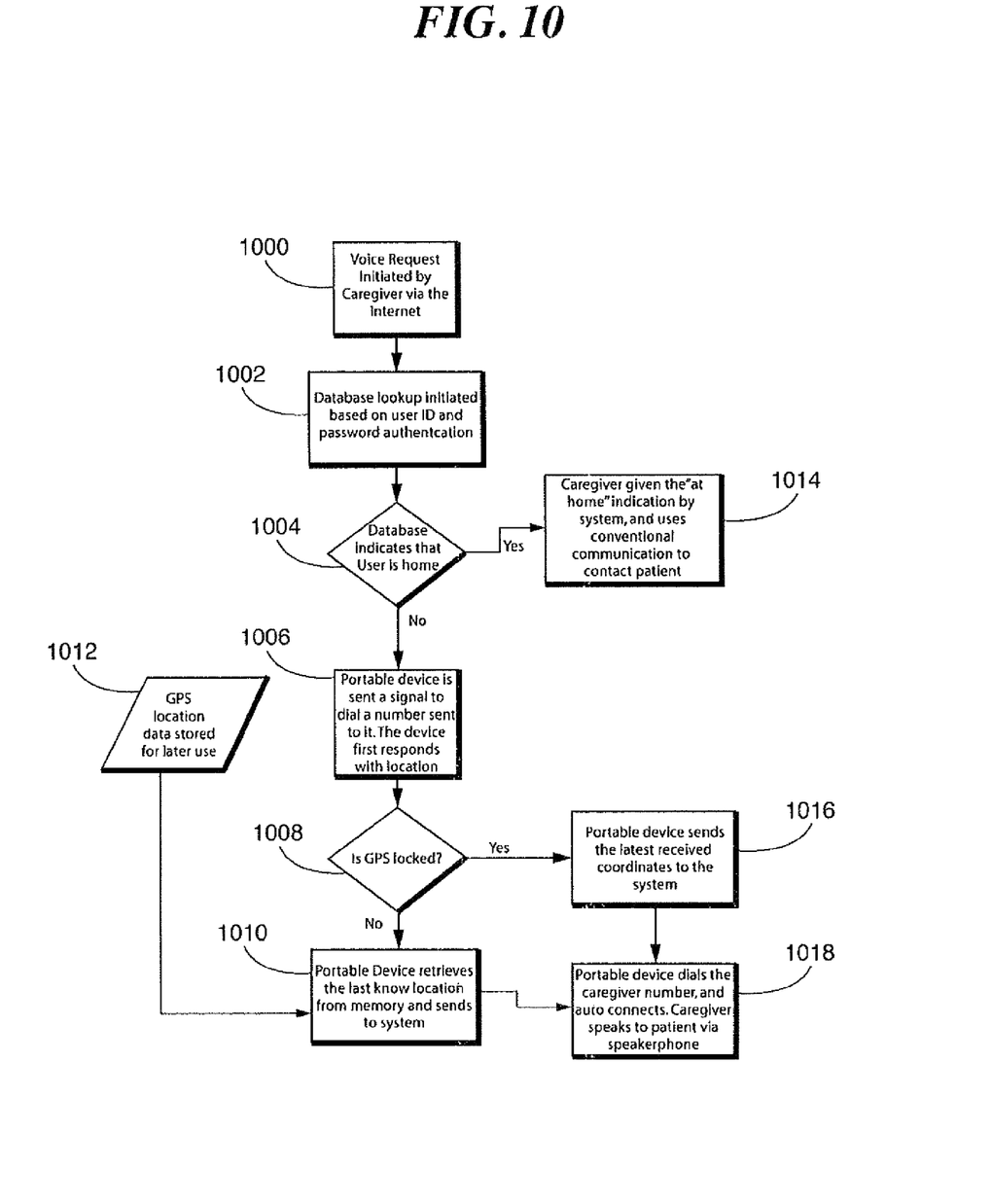
FIG. 10 is a flow chart showing the process steps of yet another embodiment of the method of the present invention.

Referring to the flow chart of FIG. 10 the following steps in the method are shown:
- 1000—Voice Request Initiated by Caregiver 60 via the Internet 46.
- 1002—Database lookup initiated based on User ID and password authentication.
- 1004—Database indicates that User 10 is home.
- 1006—Portable Device 500 is sent a signal to dial a number sent to it.
- 1008—Is GPS locked?

1010—Portable Device 500 retrieves the last know location from memory and sends to system 40, 42.

1012—GPS location data stored for later use.

1014—Caregiver 60 the "at home" indication by system, and uses conventional communications to contact patient.

1016—Portable device 500 sends the latest received coordinates to the System.

1018—Portable device 500 dials the caregiver number, and auto connects, Caregiver 60 speaks to patient via speakerphone.

The method of the present invention is designed to have a use model which includes the following features and functions. The Portable 500 device will primarily be used when the subscriber leaves the home and is no longer in range of the Base Station 400. When the subscriber is at home, the Portable Device 500 will be in proximity to the Base Station 400 and will be reduced to low power mode in which the cellular components are turned to hibernate and the GPS and RF receivers are turned off. Ideally, the Portable Device 500 will be placed in a charging base which is integrated into the Base Station. The Portable Device 500 will also have an RE communicator so that the device can send an alert to base station 400 if depressed and receive RF signals from the pendant 12' when activated. When the Portable Device 500 is in the charging cradle, the device is placed into low power mode. The charging cradle is built into the base station 400. The base station 400 is capable of sending a signal via auto-dialer to indicate that the Portable Device 500 is at home. In this mode, either pendant 12 or pendant 12' working through mobile device 500 causes base station 400 to transmit the call to the response center.

When the Portable Device 500 is at home (as a preferred optional service), once you leave the proximity of the Base Station 400 the cellular device is turned on and the GPS is instructed to get a fix. Once the initial location is acquired, the GPS will be placed into a low power mode which acquires a fix at specified intervals which will be set to optimize battery life. The device will be in listening mode to detect instructions from potential inquiries. If the user has an emergency, the button of mobile device 500 is depressed and the device automatically dials a predetermined number to the response center. The call is received by the monitoring station and a DTMF code (6 digits in a 4 by 2 format) is sent to identify the user and held until an operator answers. A two-way voice communication is used to determine the issue. As the call is initiated, the location data and user data is being sent via a cellular data protocol such as GPRS to the back end system.

The RF Pendant 12, utilized with the present method is used as follows: When the user is in the home, the RF Pendant 12 is used as the communicator to the Base Station 400. If a button on RF Pendant 12 is depressed the RF module will send a simple data stream to be processed by Base Station 400 indicating an alarm is being initiated. Alternatively, in a less preferred embodiment, mobile device 500 may receive the signal and communicate with base station 400.

The RF Pendant 12' illustrates the situation of the pendant 12' being out of the proximity of base station 400 in tandem with mobile device 500. Pressing a panic button on pendant 12' produces the RF signal, which is not received by base station 400 as it is out of range. However, mobile device 500 receives the signal which triggers the auto dialer process to the response center as discussed above. It should be known, that in one embodiment mobile device 500 may be a smart phone upon which an application is loaded, the application causing the mobile device 500 to auto dial the response center and upload location information and user identification information to be used at the response center 40, 42.

In terms of the general standard response center technology, the software will be licensed from a current manufacturer of response center software. Location data will need to be added along with a presentation layer.

A database is maintained at response center/emergency response center 40, 42. The database includes a profile associated with each user 10. The database is accessed at the emergency response center 40, 42 to determine an appropriate action to be taken such as notify caregiver 60. In some situations caregiver 60 may be a relative, a neighbor or an individual who knows user 10 and will respond appropriately.

It is envisioned that the first devices utilized with the present methods would use existing modules. As a CPU module, a Rabbit Core Modules, RCM3700, can be used for this feature. The Rabbit modules come with a built in Ethernet connection, and libraries that already can use the Xbee module, MultiTech Modem, Ethernet, BlueTooth and other communication protocols. The RCM4000 comes with expanded memory, which can be used for data logging. For the modem, the MultiTech MT5600SMI-L-34.R2-SP is a plug in device that will allow dial-up on a POT's line. For RFID, the MaxStream Xbee module can be used to communicate with the remote devices. A standard plug-in pack power supply will connect to a wall outlet. An onboard power supply will convert this power into what is needed to power the base station, and charge the plug-in devices. 1.2V Ni-Cad cells can be used to provide short term power in the event of a power failure.

It is to be understood that while certain forms of the present invention have been illustrated and described herein, the present invention is not to be limited to the specific forms or arrangements of parts described and shown.

What is claimed as new and desired to be protected by Letters Patent of the United States is:

1. A system for two-way data and voice communication with a user carrying a portable device and wearable pendant, the system comprising:

a base station in communication with a response center;

the portable device having a cellular transceiver module, a GPS module and an emergency call button, the portable device selectively communicating with the base station and being in direct two-way communication with the response center, for communicating a location of the portable device to the response center, and in response to activation of the emergency call button causing the portable device to directly communicate with the response center; and the wearable pendant having a panic button, and the wearable pendant outputting a signal in response to activation of the panic button, the portable device receiving the signal from the wearable pendant; the base station determining the location of the portable device, and the base station causing the portable device not to communicate with the response center in response to the signal from the wearable pendant when a portable device location is in proximity to the base station; and causing the portable device to contact the response center when the portable device location is not in proximity of the base station; and the base station receiving the signal from the wearable pendant and the base station directly communicating with the response center in response to the signal from the wearable pendant as a function of the base station determining that the location of the portable device is in proximity to the base station.

2. The system of claim 1, wherein the portable device communicates with the response center when not in the proximity of the base station, and in response to activation of the emergency call button.

3. The system of claim 1, wherein the portable device communicates the location of the portable device to the response center in response to the signal output by the wearable pendant when the location of the portable device and the wearable pendant is not in proximity to the base station.

4. The system of claim 1 wherein the base station is incorporated into a security system for a house.

5. A method of two-way data and voice communication with a user utilizing a portable device and a base station, the portable device having a cellular transceiver module, GPS module and an emergency call button, and the user further having a wearable pendant having a panic button, the method comprising the steps of:

depressing the panic button on the wearable pendant to output an emergency signal from the wearable pendant, wherein the emergency signal is received by the base station and the portable device;

the base station determining a location of the portable device;

receiving the signal at the portable device, the portable device selectively communicating or not communicating with a response center in response to the signal from the wearable pendant as a function of the proximity of the portable device and the base station;

the base station causing the portable device not to contact the response center in response to the signal from the wearable pendant when the base station determines that the location of the portable device is in the proximity of the base station; and the base station communicating with the response center in response to the signal from the wearable pendant when the location of the portable device and wearable pendant is in proximity to the base station.

6. The method of claim 5, wherein the portable device transmits GPS location data to the response station.

7. The method of claim 5, further comprising the step of allowing voice communication between the user of the portable device and the response center upon the portable device auto dialing the response center.

8. The method of claim 5, wherein the base station autodials the response center when the location of the portable device is in proximity to the base station.

* * * * *